United States Patent Office 3,051,551
Patented Aug. 28, 1962

---

3,051,551
SULFAMIC ACID
Henry J. Ferlin and Robert E. Brady, Joliet, and Walter J. Merwin, Orland Park, Ill., assignors to Olin Mathieson Chemical Corporation, East Alton, Ill., a corporation of Virginia
No Drawing. Filed Nov. 3, 1959, Ser. No. 850,539
2 Claims. (Cl. 23—166)

This invention relates to sulfamic acid and particularly to an improved process for the manufacture of sulfamic acid from urea and oleum.

When urea is added to oleum, a vigorous exothermic reaction occurs resulting in the formation of sulfamic acid and carbon dioxide. The reaction takes place in two stages as represented in the following equations:

$$NH_2CONH_2 + SO_3 = NH_2-CONH-SO_3H$$
$$NH_2CONHSO_3H + H_2SO_4 = 2NH_2SO_3H + CO_2$$

The reaction is substantially instantaneous and care must be taken to keep it under control. If not, the components of the reaction mixture will react with explosive violence. A desirable rate of reaction is normally achieved by maintaining the temperature of the mixture at predetermined temperature levels. By maintaining the temperature below about 50° C., the first reaction goes smoothly to completion while the second reaction is suppressed. Thereafter, the solution of urea sulfonic acid is heated so as to obtain commercial yields of sulfamic acid by the second reaction. While this method has met with commercial success, the necessity of maintaining the temperature within predetermined limits has presented a rather formidable problem. In general, this has been done by external cooling, by refluxing sulfur trioxide, or by processes involving rather elaborate recycling of the reaction mixture. Such processes are relatively uneconomical and troublesome because they require constant surveillance and special equipment such as jacketed reaction vessels, recycle circuits and refrigeration units.

In addition, the present commercial methods for the manufacture of sulfamic acid involve the dissolution of urea in oleum having a strength in the neighborhood of 45% to 53%. When oleum of this strength is employed, the requisite molar amount of sulfur trioxide is readily available. However, such processes have a serious inherent disadvantage in that the mixture is exceedingly viscous and thus difficult to pump and transmit through fluid lines.

It is, therefore, an object of this invention to provide an improved and novel process for the manufacture of sulfamic acid overcoming the disadvantages of the prior art. Another object of this invention is to provide a simplified process for the manufacture of sulfamic acid in which the need for external cooling is obviated. A more specific object of this invention is to provide a process for the manufacture of sulfamic acid in which the temperature of reaction is readily controlled.

In accordance with this invention, generally stated, these and other objects are accomplished by reacting urea with oleum having sufficient sulfur trioxide dissolved therein to dissipate the heat evolved by the reaction of these materials to form sulfamic acid. More specifically, this invention contemplates a method for the preparation of sulfamic acid by dissolving urea in oleum having a strength between about 79% and about 82% and controlling the rate of reaction and its temperature by the evaporation of sulfur trioxide. The reactants are mixed in such proportions that there is substantially one mole of sulfuric acid for each mole of urea introduced into the reaction mixture. Since the reaction also requires one mole of sulfur trioxide for each mole of urea, the amount of sulfur trioxide present in oleum of the requisite strength is much greater than that required to carry out the reaction. This excess of sulfur trioxide in accordance with this invention is maintained between about 360% and about 455% on a mole basis.

The excess of sulfur trioxide based on the urea entering into the reaction must be maintained between these limits. When equimolar proportions of urea and sulfuric acid are employed, this range of excess sulfur trioxide is obtained by utilizing oleum having a strength between about 79% and 82%. The 360% molar excess represents the amount of sulfur trioxide required to dissipate the heat evolved in both steps of the reaction. If lesser amounts of sulfur trioxide are employed, additional cooling means must be provided. On the other hand, if the excess of sulfur trioxide exceeds about 455%, it serves no useful purpose and merely increases the amount of material being processed.

In carrying out the process of this invention, the urea in granular, pelletized, or any other desirable form, is gradually added to the oleum at ambient temperature and under atmospheric pressure. Urea readily dissolves in the oleum reacting with sulfur trioxide to form urea sulfonic acid. The heat of reaction is quite appreciable and causes the evaporation of approximately one-half of the excess sulfur trioxide dissolved in the oleum. The sulfur trioxide is permitted to evaporate at atmospheric pressure and thus the first phase of the reaction attains its own equilibrium temperature at about 50° C. to about 70° C. After the urea is completely dissolved in the highly concentrated oleum, the second exothermic reaction takes place with the evaporation of the remainder of the excess sulfur trioxide.

In carrying out the process of the present invention, the heat generated by the exothermic reactions is substantially equivalent to the heat of evaporation of the excess sulfur trioxide present in the oleum. Thus, any need for external cooling means is obviated. Approximately one-half of the excess sulfur trioxide is evaporated during the first stage reaction and the remainder of the excess sulfur trioxide is utilized in controlling the second stage reaction. The gaseous sulfur trioxide driven out of the reaction mix is absorbed in sulfuric acid or oleum and utilized in the preparation of additional 79%–82% oleum.

Preferably, the reaction is carried out in two stages. In the first step, urea is added to oleum and the reaction mixture maintained at a temperature approximating the boiling point of oleum so as to insure the complete conversion of urea to urea sulfonic acid while suppressing the second reaction. The resultant solution is then heated to about 80° C. and transferred to a second reaction vessel containing a heel of sulfamic acid at the same temperature. The reaction mixture is held at that temperature level by the evolution of the remaining excess sulfur trioxide. Alternately, the process can be executed in one reaction vessel. In such a case, urea and oleum are fed simultaneously into the reactor which may or may not contain a heel of crude sulfamic acid. Thus, the two steps of the reaction involved can take place in the same or in separate vessels. Also, each of the reactions can be carried out in the presence or absence of a heel of crude sulfamic acid. Likewise, the urea can be mixed with a stream of 79%–82% oleum in a continuous operation.

The present process is convenient and readily susceptible to control. The highly concentrated oleum mixture employed is considerably less viscous than when 45%–50% oleum is employed and the handling difficulties normally considered to be inherent to sulfamic acid manufacturing processes are thereby eliminated. The sulfur trioxide evaporation rate is primarily dependent upon the heat evolved from the reactions. However, the amount of sulfur trioxide evaporated and thus the cooling effect obtained thereby can be readily controlled by bubbling an inert gas through the reaction mixture. When an inert gas, such as air, nitrogen, or the like, is thus utilized, the rate of evaporation is roughly proportional to the amount of the gas. Controlling the rate of evaporation in such a manner is particularly advantageous because the gas bubbling through the reaction mixture serves a dual role. In addition to controlling the cooling rate, it also serves as a means of agitation.

The present invention and the manner in which it accomplishes its objects will be more readily understood by reference to the following preferred embodiment thereof. In this embodiment and throughout the specification, all parts are expressed by weight unless otherwise designated.

Into a suitable vessel containing approximately 467 parts of 79% oleum were gradually added about 60 parts of granular urea. Both the urea and oleum were at ambient temperature and the reaction was carried out under atmospheric pressure. The reaction mixture was continuously agitated during the urea addition to insure uniform distribution. The urea dissolved readily in the oleum, forming a solution of urea sulfonic acid. As the reaction progressed, the heat generated thereby evaporated about one-half of the excess sulfur trioxide and the reaction mixture attained an equilibrium temperature of approximately 60° C.

The intermediate premixture thus prepared was very fluid and could be easily pumped and poured. It was fed into a second vessel provided with agitating means and containing a heel of about 2,000 parts of crude sulfamic acid heated to a temperature of about 80° C. The second stage of the reaction then took place with the formation of sulfamic acid and the evolution of carbon dioxide. The excess sulfur trioxide was expelled as in the first stage reactor and the heat of the second reaction balanced the heat of vaporization of the sulfur trioxide. The second reaction thus progressed smoothly to completion at a temperature of about 80° C. About 2200 parts of crude sulfamic acid having a purity of about 85% was thus obtained. This represents about 88% of the theoretical yield.

Although the invention has been described in considerable detail in the foregoing, it is to be understood that the purpose of such detail is only for clarification of the invention and that many modifications can be made by those skilled in the art without departing from the spirit and scope of the invention, except as it is limited by the appended claims.

What is claimed is:

1. A process for the manufacture of sulfamic acid which comprises dissolving urea in oleum having a strength between about 79% and about 82% to provide a sulfur trioxide molar excess between 360% and 455% based on the urea, employing substantially 1 mole of urea for each mole of sulfuric acid, maintaining the resultant reaction mixture between about 50° C. and about 70° C. solely by evaporation of sulfur trioxide from the solution until the urea is substantially completely dissolved, and thereafter elevating the temperature of the reaction mix to at least about 80° C. and dissipating the heat of reaction by evaporation of sulfur trioxide from the mixture.

2. A process for the manufacture of sulfamic acid comprising dissolving urea in oleum of a strength between about 79% and 82% to provide a sulfur trioxide molar excess between 360% and 455% based on the urea, maintaining the resultant mixture between about 50° C. and about 70° C. solely by evaporation of sulfur trioxide from the solution until the urea is completely dissolved, and adding the mixture to a heel of dry sulfamic acid while maintaining the dry sulfamic acid and the mixture at a temperature of at least about 80° C. and dissipating the heat of reaction by evaporation of sulfur trioxide from the mixture.

References Cited in the file of this patent

UNITED STATES PATENTS

| | | |
|---|---|---|
| 2,390,648 | Hill et al. | Dec. 11, 1945 |
| 2,408,823 | Tauch | Oct. 8, 1946 |
| 2,880,064 | Harbaugh et al. | Mar. 31, 1959 |